US009215717B2

(12) United States Patent
Aragon (10) Patent No.: US 9,215,717 B2
(45) Date of Patent: Dec. 15, 2015

(54) METHODS AND APPARATUS FOR CHANNEL SELECTION WITHIN A WIRELESS NETWORK (75) Inventor: David Aragon, Berkeley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 690 days.

(21) Appl. No.: 13/424,669

(22) Filed: Mar. 20, 2012

(65) Prior Publication Data
US 2013/0252653 A1 Sep. 26, 2013

(51) Int. Cl.
H04W 72/04 (2009.01)
H04W 72/08 (2009.01)

(52) U.S. Cl.
CPC .................. *H04W 72/082* (2013.01)

(58) Field of Classification Search
CPC .......... H04W 72/082; H04W 72/1226; H04W 28/0231; H04W 40/12; H04W 40/16
See application file for complete search history.

(56) References Cited

U.S. PATENT DOCUMENTS

| 5,455,821 | A | * | 10/1995 | Schaeffer et al. | ............. | 370/332 |
| 2003/0050067 | A1 | | 3/2003 | Rozmaryn | | |
| 2004/0203828 | A1 | | 10/2004 | Mirchandani et al. | | |
| 2009/0257405 | A1 | * | 10/2009 | Stamoulis et al. | ............. | 370/332 |

OTHER PUBLICATIONS

"Simulated Annealing", definition retrieved from Wikipedia Website on Oct. 6, 2011 (http://en.wikipedia.org/wiki/Simulated_annealing).

M.W. Rocha da Silva and J. Ferreira de Rezende, " A Dynamic Channel Allocation Mechanism for IEEE 802.11 Networks", 2006 International Telecommunications Symposium, Sep. 2006, pp. 225-230.
D.J. Leith and P. Clifford, "A Self-Managed Distributed Channel Selection Algorithm for WLANS," 2006 4th International Symposium on Modeling and Optimization in Mobile, Ad Hoc and Wireless Networks, pp. 1-9.
K. Duffy, N. Oconnell, and A. Sapozhnikov, "Complexity Analysis of A Decentralised Graph Colouring Algorithm," Information Processing Letters, vol. 107, Jul. 2008, pp. 60-63.
P. Roussel-Ragot and G. Dreyfus, "A Problem Independent Parallel Implementation of Simulated Annealing: Models and Experiments", IEEE Transactions on Computer-Aided Design, vol. 9, No. 8, Aug. 1990, pp. 827-835.
S. Kirkpatrick, C.D. Gelatt and M.P. Vecchi, "Optimization by Simulated Annealing", Science, New Series, vol. 220, No. 4598, May 13, 1983, pp. 671-680.

(Continued)

Primary Examiner — Fanghwa Wang
(74) Attorney, Agent, or Firm — Cooley LLP (57) ABSTRACT In some embodiments, a method includes calculating, at a wireless access point (WAP) from a set of WAPs within a network, an interference value for each channel from a set of channels of the WAP. The method includes calculating, based on the interference value for each channel, a total move weight of the WAP. The method includes receiving, at the WAP, a total move weight from each remaining WAP. The method includes selecting one WAP from the set of WAPs based on a random number, the total move weight of the WAP, the total move weights from the remaining WAPs, and a rank of the WAPs. The method further includes changing, if the WAP is selected, a designated channel of the WAP to one of the remaining channels; and sending a signal to modify an active channel of the WAP to correspond with the designated channel.

20 Claims, 4 Drawing Sheets (56) References Cited

OTHER PUBLICATIONS

D. S. Johnson, C.R. Aragon, L.A. McGeoch and C. Schevon, "Optimization by Simulated Annealing: An Experimental Evaluation; Part II, Graph Coloring and Number Partitioning", Operations Research, vol. 39, No. 3, May-Jun. 1991, pp. 378-406.

J. E. Savage and M.G. Wloka, "Parallel Graph-Embedding and the Mob Heuristic", Brown University Dept. of Computer Science, Technical Report No. CS-91-07, Feb. 20, 1991.
Search Report for European Patent Application No. 13159985.4 dated Aug. 6, 2015.
Office Action for Chinese Patent Application No. 201310100112.X dated Aug. 11, 2015.

* cited by examiner

METHODS AND APPARATUS FOR CHANNEL SELECTION WITHIN A WIRELESS NETWORK

BACKGROUND

Some embodiments described herein relate generally to radio channel assignment in wireless local area networks (WLANs), and, in particular, to methods and apparatus for distributedly assigning radio channels in a WLAN.

In a WLAN system, each access point (AP) needs to be assigned an operating channel from a limited number of available channels. In some known WLANs, channels can be randomly assigned to the APs. Such a randomized approach, however, typically does not detect or avoid specific cases where severe interference can occur between neighboring APs. Some other known WLANs implement a centralized network planning tool to generate a channel assignment plan. In such WLANs, however, the interference estimates are typically not based on live radio frequency (RF) data. Furthermore, as the number of APs increases, the complexity of computing the channel assignment plan can grow unreasonably large for the computer that hosts the centralized network planning tool. In some other known WLANs, each AP can separately examine its environment and choose a least-interfered-with channel. Such an approach, however, does not work well for a large WLAN because a previous decision made at an AP will typically be invalidated by its neighbor AP's new decision due to little cooperation among the neighboring APs.

Accordingly, a need exists for a distributed processing method for optimally assigning radio channels in a WLAN.

SUMMARY

In some embodiments, a method includes calculating, at a wireless access point (WAP) from a set of WAPs within a network, an interference value for each channel from a set of channels of the WAP. The method includes calculating, based on the interference value for each channel, a total move weight of the WAP. The method includes receiving, at the WAP, a total move weight from each remaining WAP. The method includes selecting one WAP from the set of WAPs based on a random number, the total move weight of the WAP, the total move weights from the remaining WAPs, and a rank of the WAPs. The method further includes changing, if the WAP is selected, a designated channel of the WAP to one of the remaining channels; and sending a signal to modify an active channel of the WAP to correspond with the designated channel.

DETAILED DESCRIPTION

In some embodiments, a method includes calculating, at a wireless access point (WAP) from a set of WAPs within a network, an interference value for each channel from a set of channels of the WAP. The method includes calculating, based on the interference value for each channel from the set of channels, a total move weight of the WAP. In some embodiments, the calculating the total move weight of the WAP can be based on calculating a set of move weights using a stochastic optimization algorithm. In such embodiments, each move weight from the set of move weights can be associated with a channel change from a designated channel from the set of channels to one of the remaining channels from the set of channels. In some embodiments, the designated channel can be randomly selected from the set of channels prior to calculating the interference value for each channel from the set of channels.

The method includes receiving, at the WAP, a total move weight from a set of total move weights from each remaining WAP from the set of WAPs. The method also includes selecting one WAP from the set of WAPs based on, a random number, the total move weight of the WAP, the set of total move weights from the remaining WAPs from the set of WAPs, and a rank of the set of WAPs. In some embodiments, the random number can be defined at the WAP, and sent to the remaining WAPs from the set of WAPs such that each WAP from the remaining WAPs can select the one WAP from the set of WAPs based at least in part on the random number. In some embodiments, the rank of the set of WAPs can be based on an identifier of each WAP from the set of WAPs. In some embodiments, the method can include sending, from the WAP, the total move weight for the WAP to the remaining WAPs from the set of WAPs such that each remaining WAP from the set of WAPs can select the one WAP from the set of WAPs.

If the WAP is selected, the method further includes changing the designated channel of the WAP to one of the remaining channels from the set of channels, and sending a signal to modify an active channel of the radio of the WAP to correspond with the designated channel. In some embodiments, the selected WAP can send an identifier of the designated channel to the remaining WAPs from the set of WAPs in response to the changing. In some embodiments, if the WAP is not selected, the unselected WAP can receive a change indication associated with a channel change at a selected WAP from the set of WAPs.

In some embodiments, the method can include repeating for a number of times a process of calculating the interference value for each channel, calculating the total move weight of the WAP, receiving the total move weight from each remaining WAP, selecting one WAP, and changing the designated channel. In such embodiments, a signal to change the designated channel of the radio of the WAP can be sent after the number of times of repetition.

In some embodiments, if the WAP is selected, the method can include selecting a channel from the set of channels not currently the designated channel based on a set of channel move weights, another random number, and a rank of the set of channels not currently the designated channel. In such embodiments, each channel move weight from the set of channel move weights can be associated with a possible channel change from the designated channel from the set of channels to one of the remaining channels from the set of channels.

In some embodiments, an apparatus includes a channel weight module, a WAP selection module, a channel selection module, and a channel implementation module. The modules are associated with a WAP from a set of WAPs within a network. The channel weight module is configured to calculate a set of channel move weights using, for example, a stochastic optimization algorithm. Each channel move weight from the set of channel move weights is associated with a possible channel change from a designated channel from a set of channels of the WAP to one of the remaining channels from the set of channels. The channel weight module is further configured to calculate a total move weight for the WAP based on the set of channel move weights.

The WAP selection module is operatively coupled to the channel weight module. The WAP selection module is configured to receive, from each remaining WAP from the set of WAPs, a total move weight. The WAP selection module is further configured to select one WAP from the set of WAPs based on a first random number, the total move weight of each WAP from the set of WAPs, and a rank of the set of WAPs. In some embodiments, the channel weight module can be configured to send the total move weight for the WAP to the remaining WAPs from the set of WAPs such that each remaining WAP from the set of WAPs can select the one WAP from the set of WAPs.

The channel selection module is operatively coupled to the WAP selection module. If the WAP is selected by the WAP selection module, the channel selection module is configured to select one of the remaining channels from the set of channels based on a second random number, the set of channel move weights, and a rank of the remaining channels from the set of channels. In some embodiments, the second random number can be equal to the first random number. The channel selection module is further configured to change the designated channel to the selected one of the remaining channels. The channel implementation module is operatively coupled to the channel selection module, and configured to send a signal to implement the designated channel as an active channel of a radio of the WAP.

In some embodiments, the apparatus can include an interference module operatively coupled to the channel weight module. The interference module can be configured to calculate, at the WAP, an interference value for each channel from the set of channels. In such embodiments, the channel weight module can be configured to calculate the set of channel move weights based on the interference value for each channel from the set of channels.

As used herein, a module can be, for example, any assembly and/or set of operatively-coupled electrical components, and can include, for example, a memory, a processor, electrical traces, optical connectors, software (executing or to be executed in hardware) and/or the like.

As used herein, the singular forms "a," "an" and "the" include plural referents unless the context clearly dictates otherwise. Thus, for example, the term "a WAP" is intended to mean a single wireless access device or a combination of devices associated with a wireless-access function.

Figure 1:
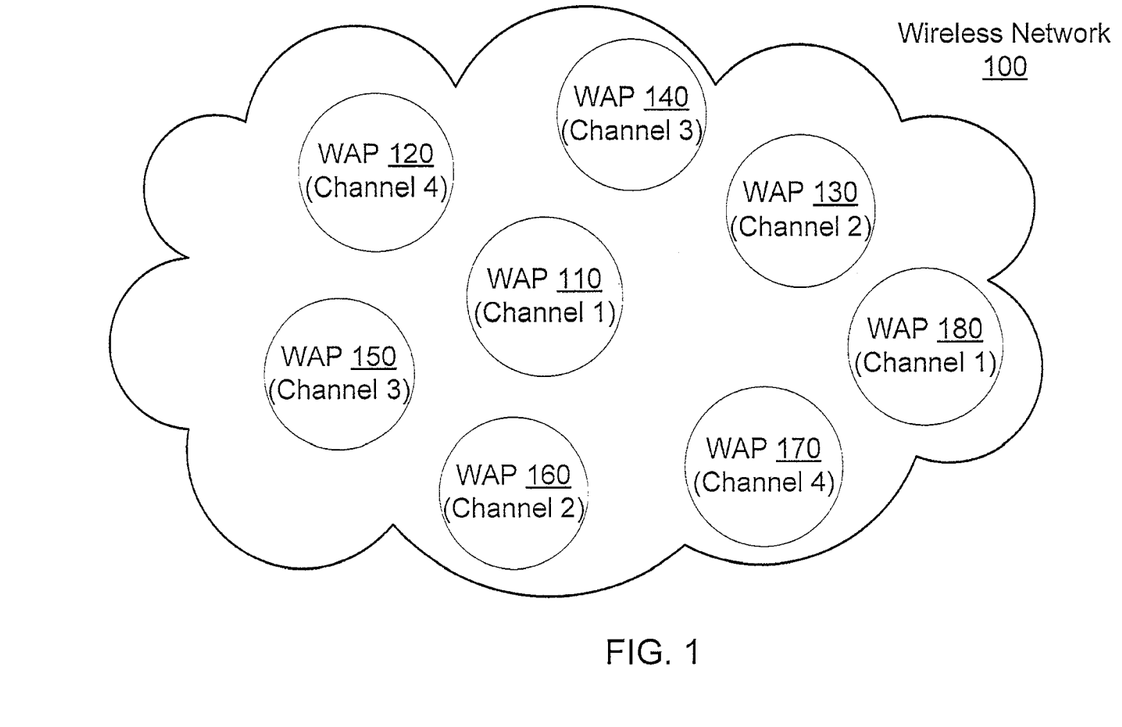
FIG. 1 is a schematic illustration of a wireless network, according to an embodiment.

FIG. 1 is a schematic illustration of a wireless network 100, according to an embodiment. The wireless network 100 can be any network that enables wireless communication devices (e.g., cellular phones, Wi-Fi enabled laptops, Bluetooth devices, mobile devices, tablets) to communicate with each other. In some embodiments, the wireless network 100 can be implemented and administered using a wireless transmission system such as radio frequency (RF) waves. For example, the wireless network 100 can be a WLAN that enables devices capable of wireless functionality (e.g., Wi-Fi enabled laptops and computers, smart phones, tablets) to be operatively connected and communicate with each other. In some embodiments, the wireless network 100 can be at least a portion of, for example, a WLAN, a Wi-Fi network, a wireless mesh network, a wireless metropolitan area network (MAN), a wireless wide area network (WAN), a mobile device network (e.g., a global system for mobile communications (GSM) network, a personal communications service (PCS) network), a radio access network (RAN), and/or the like.

The wireless network 100 can include multiple WAPs, such as the WAPs 110-180 as shown in FIG. 1. Each WAP 110-180 can be any device configured to be wirelessly coupled to and communicate with one or more wireless communication devices (not shown in FIG. 1). In some embodiments, each WAP 110-180 can be, for example, a computer device, a mobile device, a server device, a workstation, and/or the like. In some embodiments, the WAPs 110-180 can be operatively coupled to each other and/or other devices of the wireless network 100 via, for example, a wired network (not shown in FIG. 1). As a result, the wireless communication devices wirelessly coupled to a WAP 110-180 can be configured to communicate with other wireless communication devices wirelessly coupled to the same WAP 110-180 or another WAP 110-180 using the WAPs 110-180 as relays.

In some embodiments, each WAP 110-180 can have a radio operating at a certain channel, which can be assigned from a set of channels available to the wireless network 100. In the example of FIG. 1, the channels available to the wireless network 100 can include channels 1-4. In some embodiments, when the wireless network 100 is initialized, each WAP 110-180 can be randomly assigned a channel from the set of channels. As a result, the channel assigned to one of the WAPs 110-180 can be an active channel for that WAP. As shown in FIG. 1, the WAPs 110 and 180 can be assigned channel 1; the WAPs 130 and 160 can be assigned channel 2; the WAPs 140 and 150 can be assigned channel 3; and the WAPs 120 and 170 can be assigned channel 4. In some embodiments, information associated with the initial channel assignment can be distributed to each WAP 110-180 within the wireless network 100, such that each WAP 110-180 has the information of the channel assigned to each remaining WAP 110-180. Additionally, in some embodiments, information of an active channel assigned to a neighbor WAP can be obtained at a WAP based on the radio signal (e.g., interference signal) that is received from the neighbor WAP at that WAP.

Although it is described herein with respect to FIGS. 1-4 as each WAP having a radio, the operating frequencies of the radios associated with the WAPs need not be limited within the RF frequency range (i.e., about 3 kHz to 300 GHz) but can be any other frequencies. In some embodiments, a WAP can have, for example, a transceiver or any other suitable communication device that can operate at certain frequency channels. The radio, transceiver, or any other suitable communication device associated with the WAP can be configured to operate at any frequency channel from a set of multiple frequency channels, as described herein. Thus, it should be understood that references herein to a radio can apply to any type of appropriate radio, transceiver or communication device having any appropriate frequency(ies) and/or number appropriate channels.

In some embodiments, each WAP 110-180 can be used to cover a certain area (e.g., a cell) approximate to that WAP. That is, each WAP 110-180 can be wirelessly coupled to and communicate with one or more wireless communication devices within an operative range associated with that WAP 110-180. In some embodiments, the WAPs 110-180 can compose an interference domain within the wireless network 100. That is, the operations of each WAP 110-180 can potentially interfere with the operations (e.g., transmitting, receiving) of the remaining WAPs 110-180.

In some embodiments, a first WAP that can potentially interfere with the operations of a second WAP can be defined as a neighbor of the second WAP. In some embodiments, a WAP can be determined as a neighbor of another WAP based on factor(s) such as, for example, the distance between the two WAPs. For example, any WAP within certain proximity of a WAP can be determined as a neighbor of that WAP. In some embodiments, WAPs in the same interference domain can be considered as neighbors of each other. In FIG. 1, for example, any WAP 110-180 can be considered as a neighbor of any other WAP 110-180 from the interference domain that includes the WAPs 110-180.

The WAPs 110-180 can be configured to collectively execute a channel assigning process or method to optimize or improve the assignment of channels among those WAPs. In some embodiments, such a channel assigning process or method can be executed to improve the performance of the interference domain that includes the WAPs 110-180 to, for example, a suboptimal performance. In some embodiments, the channel assigning process or method can be executed after each WAP is assigned an initial channel from, for example, the channels 1-4. In such embodiments, each WAP 110-180 can be configured to change its channel from the active channel to a channel determined for that WAP as a result of the channel assigning process, if the active channel is different from the determined channel for that WAP. In some other embodiments, such a channel assigning process can be executed without any channel being assigned to each WAP 110-180. In such embodiments, each WAP 110-180 can be assigned a channel that is determined for that WAP as a result of the channel assigning process. Details of the channel assigning process are further described with respect to FIGS. 3-4.

Figure 2:
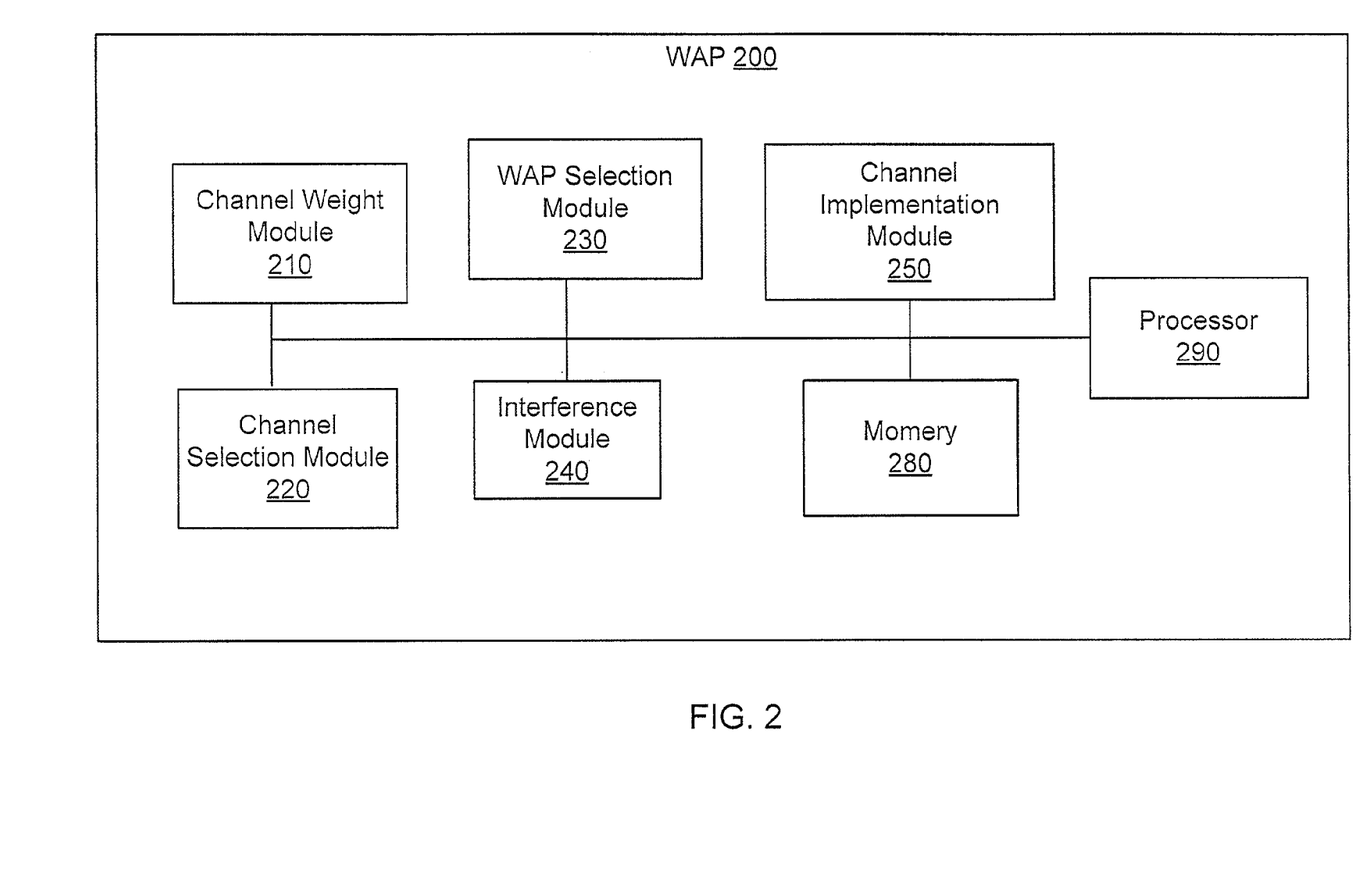
FIG. 2 is a system block diagram of a WAP, according to an embodiment.

FIG. 2 is a system block diagram of a WAP 200, according to an embodiment. The WAP 200 can be structurally and functionally similar to the WAPs 110-180 shown and described with respect to FIG. 1. The WAP 200 can be one of a set of WAPs included in an interference domain within a wireless network that is similar to the wireless network 100 shown and described with respect to FIG. 1. The WAP 200 can have a radio operating at a certain channel, which is assigned from a set of channels available to the WAPs in the interference domain. In some embodiments, the WAP 200 can have a transceiver (not shown in FIG. 2) operating at the certain channel. As shown in FIG. 2, the WAP 200 can include a processor 290, a memory 280, a channel weight module 210, a channel selection module 220, a WAP selection module 230, an interference module 240, and a channel implementation module 250. In some embodiments, the WAP 200 can be a single physical device. In other embodiments, the WAP 200 can comprise of multiple physical devices, each of which can include one or multiple modules and/or components shown in FIG. 2.

Each module or component in the WAP 200 can be operatively coupled to each remaining module or component. Each module in the WAP 200 can be any combination of hardware and/or software (stored and/or executing in hardware) capable of performing one or more specific functions associated with that module. In some embodiments, each module in the WAP 200 can include, for example, a field-programmable gate array (FPGA), an application specific integrated circuit (ASIC), a digital signal processor (DSP), and/or the like.

The memory 280 can be, for example, a random-access memory (RAM) (e.g., a dynamic RAM, a static RAM), a flash memory, a removable memory, and/or so forth. In some embodiments, the memory 280 can include and/or store, for example, a database, process, application, algorithm, virtual machine, and/or some other software modules (stored and/or executing in hardware) or hardware modules configured to execute the channel assigning process and/or associated methods. In such embodiments, instructions of executing the channel assigning process and/or the associated methods can be stored within the memory 280 and executed at the processor 290.

The processor 290 can be configured to, for example, write data into and read data from the memory 280, and execute the instructions stored within the memory 280. The processor 290 can also be configured to control, for example, the operations of the channel weight module 210, the channel selection module 220, the WAP selection module 230, the interference module 240, and the channel implementation module 250. In some embodiments, under the control of the processor 290 and based on the methods or processes stored within the memory 280, the channel weight module 210, the channel selection module 220, the WAP selection module 230, the interference module 240, and the channel implementation module 250 can be configured to collectively execute a channel assigning process to (substantially) optimize the assignment of channels among the set of WAPs including the WAP 200, as described in further details below.

The interference module 240 can be configured to calculate an interference value for each channel from the set of channels. Specifically, the interference module 240 can be configured to calculate an interference value for a designated channel associated with the WAP 200. The designated channel associated with the WAP 200 can be, for example, a channel initially assigned to the WAP 200, an active channel for the WAP 200 (i.e., in which the radio of the WAP 200 is currently operating), or a channel that is hypothetically assigned to the WAP 200 during the channel assigning process. Such an interference value can be calculated based on, for example, the designated channel for the WAP 200, the channels of its neighbor WAPs, the distances between the WAP 200 and its neighbor WAPs, the topology of the wireless network, and/or the like. In some embodiments, when the designated channel is an active channel for the WAP 200, the interference value for the designated channel can be obtained by measuring the interference signals received at the WAP 200.

Similarly, the interference module 240 can be configured to calculate an interference value for each other channel from the set of channels for the scenario where that other channel is to be hypothetically assigned to the WAP 200. Furthermore, in some embodiments, the interference module 240 can be configured to calculate a difference in interference values based on the interference values calculated and/or measured for the designated channel and for another channel. That is, the interference module 240 can be configured to calculate a value representing the increased or decreased interference if the designated channel is (hypothetically) replaced by the other channel at the WAP 200.

The channel weight module 210 can be configured to calculate a set of channel move weights based on the interference values calculated at the interference module 240. In some embodiments, each channel move weight from the set of channel move weights can be associated with a possible channel change from the designated channel for the WAP 200 to one of the remaining channels from the set of channels. In such embodiments, each channel move weight can be calculated based on, for example, the difference in interference values calculated for the hypothetical scenario that the radio of the WAP 200 is changed from the designated channel to one of the remaining channels from the set of channels. As an example, if the difference in interference values calculated for such a hypothetical scenario is a negative value (in other words, the interference value decreases by changing the channel for the WAP 200 from the designated channel to one of the remaining channel from the set of channels), the associated channel move weight can be determined as 1; otherwise, if the difference in interference values calculated for such a hypothetical scenario is a non-negative value (in other words, the interference value does not decrease by the changing), the associated channel move weight can be determined as 0. In some embodiments, the channel weight module 210 can be configured to calculate the channel move weights using a stochastic optimization algorithm such as, for example, a simulated annealing function, a stochastic hill climbing algorithm, or the like. As an example, details of using the simulated annealing function are described with respect to FIG. 3.

In some embodiments, the channel weight module 210 can be configured to calculate a total move weight for the WAP 200 based on the set of channel move weights. The total move weight can be calculated as, for example, a sum of the channel move weights calculated for the possible channel changes from the designated channel for the WAP 200 to each remaining channel from the set of channels. After the total move weight is calculated, the channel weight module 240 can be configured to further send the total move weight for the WAP 200 to the remaining WAPs (i.e., its neighbor WAPs) from the set of WAPs. In some embodiments, after calculating a total move weight (e.g., at a channel weight module), each WAP from the set of WAPs can be configured to send the resulted total move weight to, for example, a WAP selection module of each remaining WAP from the set of WAPs. As a result, each WAP from the set of WAPs including the WAP 200 can have a total move weight associated with each WAP from the set of WAPs.

After receiving the total move weight for the WAP 200 from the channel weight module 210, as well as a total move weight from each remaining WAP from the set of WAPs, the WAP selection module 230 can be configured to select one WAP from the set of WAPs. As a result, the selected WAP can be configured to make a hypothetical channel move (i.e., from a designated channel for that WAP to one of the remaining channels from the set of channels), as described herein. In some embodiments, the WAP selection module 230 can be configured to select the WAP from the set of WAPs based on a first random number, the received total move weight of each WAP from the set of WAPs, and a rank of the set of WAPs. Details of selecting a WAP from the set of WAPs are described with respect to FIG. 3.

In some embodiments, the set of WAPs can be ranked based on a predetermined order that is determined at or distributed to each WAP from the set of WAPs prior to the ranking operation. As a result, the set of WAPs including the WAP 200 and its neighbor WAPs can all be ranked in the same order at each WAP from the set of WAPs. In some embodiments, the set of WAPs can be ranked based on an identifier of each WAP from the set of WAPs. The identifier can be any unique identifier for a WAP that can be sorted in a certain order. Such an identifier can be, for example, a media access control (MAC) address, a product serial number, and/or the like for the WAP.

In some embodiments, the first random number can be generated at a specifically-designated WAP from the set of WAPs. Such a specifically-designated WAP can be designated in any suitable means. For example, a WAP that was previously selected to hypothetically change its channel in an iteration of a channel assigning process can be designated to generate a random number for the next iteration of the channel assigning process. For another example, a WAP at a given position in the rank of the WAPs can be designated to generate a random number for each iteration of the channel assigning process. In such embodiments, the random number can be sent from the specifically-designated WAP to each remaining WAP from the set of WAPs. In some other embodiments, the random number can be provided to the set of WAPs from an outside source such as, for example, an operator of the wireless network. In such embodiments, the random number can be entered into, for example, one of the WAPs from the outside source. The random number can then be distributed to each remaining WAP from the set of WAPs.

If the WAP 200 is selected at the WAP selection module 230 as the WAP to make a hypothetical channel move (i.e., from the designated channel for the WAP 200 to one of the remaining channels from the set of channels), the channel selection module 220 can be configured to select one of the remaining channels from the set of channels. As a result, the WAP 200 can be configured to make a hypothetical channel move from the designated channel for the WAP 200 to the selected channel from the set of channels. Thus, the selected channel becomes the new designated channel for the WAP 200. Furthermore, the WAP 200 can be configured to send information associated with the hypothetical channel move to each remaining WAP from the set of WAPs. The information sent from the WAP 200 to the remaining WAPs can include, for example, the previous designated channel for the WAP 200, the current designated channel for the WAP 200 (i.e., the channel selected from the remaining channels at the channel selection module 220), and/or other related information.

In some embodiments, the channel selection module 220 can be configured to make the selection based on a second random number, the set of channel move weights associated with the WAP 200 that are calculated at the channel weight module 210, and a rank of the remaining channels from the set of channels. Details of selecting a channel from the remaining channels from the set of channels are described with respect to FIG. 3.

In some embodiments, the second random number can be equal to the first random number. In such embodiments, the first random number that is generated or received at the WAP 200 and used at the WAP selection module 230 in selecting a WAP from the set of WAPs can also be used at the channel selection module 220 to select a channel from the remaining channels. In some other embodiments, the second random number can be a new random number that is generated, for example, at the WAP 200 to be used to select a channel. In some embodiments, the remaining channels from the set of channels can be ranked in any arbitrary order. Furthermore, in some embodiments, the order to rank the channels can be different from one iteration to another iteration of the channel assigning process.

At the end of the channel assigning process (e.g., after the wireless network is converged), each WAP from the set of WAPs including the WAP 200 can be associated with a designated channel. The channel implementation module 250 can then be configured to send a signal to implement the designated channel for the WAP 200. In some embodiments, the signal can be sent to the transceiver of the WAP 200 such that the operating frequency of the transceiver is changed to the designated channel. In some embodiments, if an active channel different from the designated channel exists for the WAP 200, the existing active channel can be replaced by the designated channel. As a result, the radio of the WAP 200 can be configured to operate in the designated channel. Similar to the WAP 200, each other WAP from the set of WAPs can be configured to operate in its designated channel.

Figure 3:
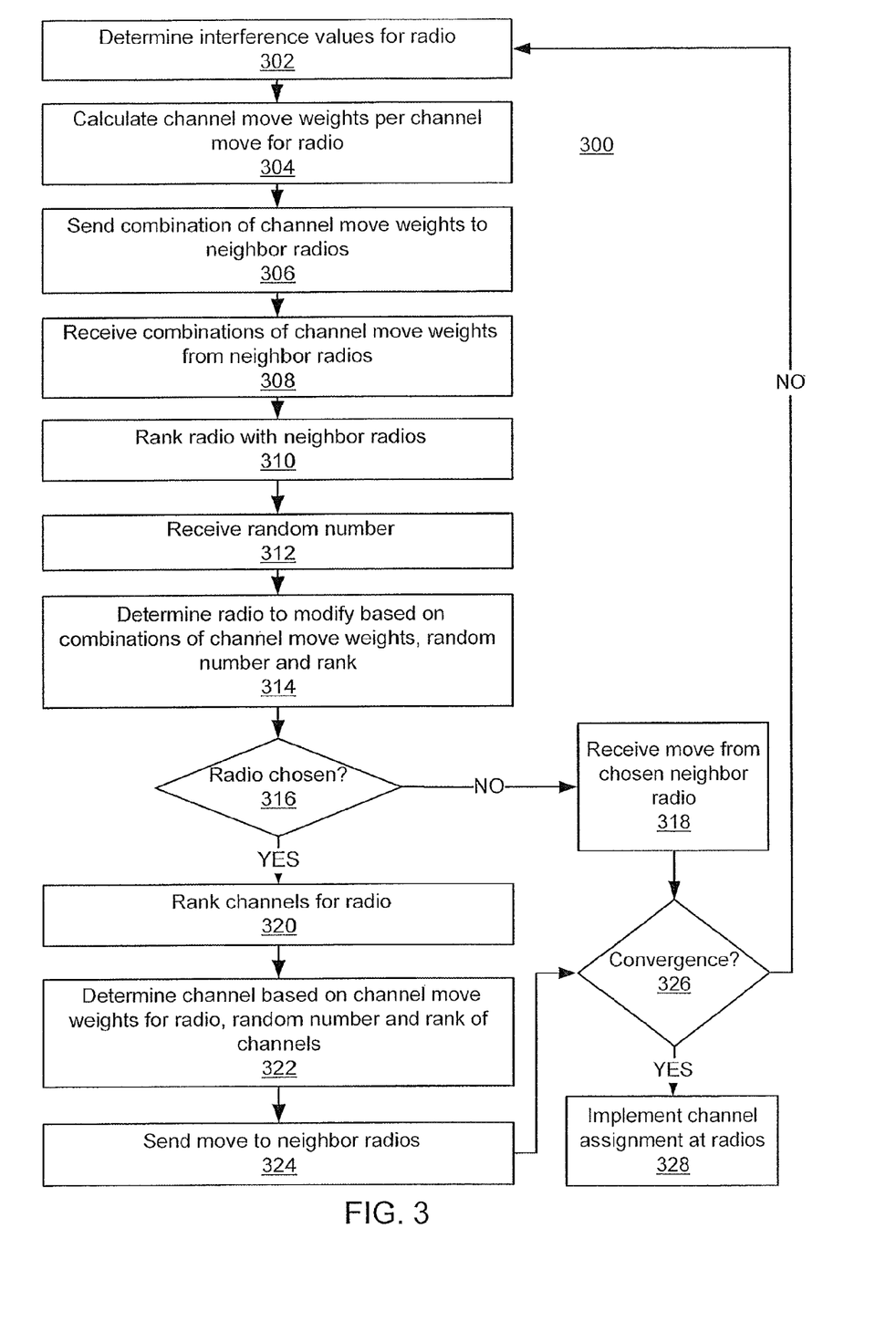
FIG. 3 is a flow chart illustrating a method for assigning channels in a wireless network, according to an embodiment.

FIG. 3 is a flow chart illustrating a method for assigning channels in a wireless network, according to an embodiment. The channel assigning process 300 shown and described with respect to FIG. 3 can be executed at, for example, a WAP operating a radio within a wireless network. The WAP can be structurally and functionally similar to the WAP 200 shown and described with respect to FIG. 2. Furthermore, the WAP that operates the radio can include, for example, a channel weight module, a channel selection module, a WAP selection module, an interference module, and a channel implementation module. The modules included in the WAP can be structurally and functionally similar to the modules 210-250 of the WAP 200 shown and described with respect to FIG. 2.

The radio can be one of a set of radios, each of which is operated at a WAP from a set of WAPs within the wireless network. The set of WAPs can be similar to the set of WAPs 110-180 within the wireless network 100 in FIG. 1. Although the steps 302-328 of the channel assigning process 300 are described from the perspective of one radio (referred to as "the radio" herein) from the set of radios, the same procedure can be executed at each remaining radio from the set of radios in a similar way. The remaining radios from the set of radios can be considered as neighbor radios of the radio.

In some embodiments, prior to or at the beginning of the channel assigning process 300, each radio from the set of radios can be assigned a designated channel from the set of channels. In such embodiments, the designated channel for each radio can be, for example, randomly selected from the set of channels. Furthermore, information of the designated channel for each radio can be distributed to each remaining radio from the set of radios. Thus, each radio from the set of radios can store the information of the designated channel for each other radio from the set of radios at, for example, a memory (e.g., the memory 280 in FIG. 2) associated with that radio. In some embodiments, a designated channel for a radio from the set of radios can be an active channel for that radio. In some other embodiments, the designated channel can be hypothetically selected (i.e., not implemented) for a radio from the set of radios. Additionally, each radio from the set of radios can be configured to operate in a (substantially) synchronized fashion. As a result, the radios can cooperate with each other by, for example, performing the same task (e.g., calculating channel move weights, sending combinations of channel move weights, selecting a radio or a channel, etc.) at substantially the same time.

In the example of FIG. 1, the WAPs 110-180 can compose a set of WAPs that are included within an interference domain in the wireless network 100. As described with respect to FIG. 1, the WAPs 120-180 can be the neighbor WAPs for the WAP 110. Each of the WAPs 110-180 can be randomly assigned a (hypothetical) designated channel prior to or at the beginning of a channel assigning process that is to be executed at the WAPs 110-180. Each designated channel can be selected from a set of channels including channels 1-4. As shown in FIG. 1, the WAPs 110 and 180 can be assigned channel 1; the WAPs 130 and 160 can be designated channel 2; the WAPs 140 and 150 can be assigned channel 3; and the WAPs 120 and 170 can be assigned channel 4. The WAPs 110-180 can operate in a substantially synchronized fashion during the channel assigning process, such that they can cooperate with each other to execute the process as described herein.

At 302, interference values for the radio can be determined. The interference values can be measured or calculated at, for example, the interference module (e.g., the interference module 240 of the WAP 200 shown and described with respect to FIG. 2) associated with the radio. Specifically, a current interference value between the radio and its neighbor radios can be measured or calculated. The current interference value represents the interference value that is measured or calculated for the scenario that the radio and its neighbor radios are all at their current designated channels. Furthermore, a hypothetical interference value between the radio and its neighbor radios can be calculated for each channel move that can be potentially operated at the radio. The hypothetical interference value for a channel move represents the interference value that is calculated for the scenario that the radio is hypothetically changed from its designated channel to one of the remaining channels from the set of channels, while its neighbor radios are still at their designated channels.

In some embodiments, a difference in interference values can be calculated based on the current and hypothetical interference values that are measured and/or calculated. The difference in interference values for a channel move represents a change (e.g., an increase, a decrease) in interference value resulted from the channel move, which can be obtained by deducting the current interference value from the hypothetical interference value associated with the channel move.

In the example of FIG. 1, a current interference value between the WAP 110 and its neighbor WAPs 120-180 can be measured or calculated for the scenario that each WAP 110-180 is at its designated channel as shown in FIG. 1. A hypothetical interference value between the WAP 110 and its neighbor WAPs 120-180 associated with each possible channel move at the WAP 110 can be calculated for the scenario that the WAP 110 is hypothetically changed to a remaining channel and its neighbor WAPs 120-180 are still at their designated channels as shown in FIG. 1. The possible channel moves at the WAP 110 include changing the designated channel for the WAP 110 from channel 1 to channel 2, channel 3, or channel 4. Thus, three hypothetical interference values for the WAP 110 can be calculated.

Furthermore, based on the measured and/or calculated current and hypothetical interference values, a difference in interference values can be calculated for each possible channel move at the WAP 110. Each difference in interference values for a possible channel move (e.g., from channel 1 to channel 2, channel 3, or channel 4) at the WAP 110 can be obtained by deducting the current interference value from the hypothetical interference value associated with that channel move.

At 304, a channel move weight can be calculated for each channel move for the radio. The channel move weights can be calculated at, for example, the channel weight module (e.g., the channel weight module 210 in the WAP 200 shown and described with respect to FIG. 2) associated with the radio. In some embodiments, the channel move weight can be calculated based on the difference in interference values associated with that channel move for the radio. In some embodiments, for example, if the difference in interference values associated with the channel move is a negative value (i.e., the interference value is reduced as a result of the channel move), the channel move weight can be determined as a first positive value (e.g., 2); otherwise, if the difference in interference values associated with the channel move is a non-negative value (i.e., the interference value is increased or remains unchanged as a result of the channel move), the channel move weight can be determined as a second positive value lower than the first positive value (e.g., 1). For another example, if the difference in interference values associated with the channel move is a negative value (i.e., the interference value is reduced as a result of the channel move), the channel move weight can be determined as a constant positive value (e.g., 1); otherwise, if the difference in interference values associated with the channel move is a non-negative value (i.e., the interference value is increased or remains unchanged as a result of the channel move), the channel move weight can be determined as zero.

In the example of FIG. 1, a channel move weight can be calculated at the WAP 110 for each possible channel move that can be operated at the WAP 110. Assume that the interference value is increased as a result of the designated channel of the WAP 110 is changed from channel 1 to channel 3 or channel 4, and the interference value is decreased as a result of the designated channel of the WAP 110 is changed from channel 1 to channel 2. As a result, if the first method described above (i.e., using two positive values 2 and 1) is adopted, the channel move weight for the channel move from channel 1 to channel 3 or channel 4 can be determined as 1, and the channel move weight for the channel move from channel 1 to channel 2 can be determined as 2.

In some embodiments, the channel move weights can be determined based on the differences in interference value in any other suitable means. In some embodiments, the channel move weights can be calculated using a stochastic optimization algorithm such as, for example, a simulated annealing function, a stochastic hill climbing algorithm (an algorithm that selects a move at random (not necessarily with equal probability) from the set of moves that improve the function), or the like. For example, according to the simulated annealing function, a channel move weight (denoted by W) for a channel move can be calculated as: $W=\exp[-\Delta E/T(t)]$, where $\Delta E=e-e'$, e denotes the corresponding hypothetical interference value, e' denotes the corresponding current interference value, $\Delta E$ denotes the corresponding difference in interference values, and $T(t)$ denotes a global parameter (called the temperature) for the $t^{th}$ iteration of the channel assigning process 300 (t=1, 2, 3, . . . , etc.).

Based on such a simulated annealing function, all channel move weights are positive values. At each iteration of the channel assigning process 300 (i.e., for a fixed temperature $T(t)$), a greater difference in interference values can result a smaller channel move weight. As a result, the channel move weight for a channel move that results in less interference than the current designated channel (i.e., a negative difference in interference values) is greater than the channel move weight for another channel move that results in more interference than the current designated channel (i.e., a positive difference in interference values). Thus, as further described with respect to step 322 (selecting a channel move based on the calculated channel move weights), the channel move that results in less interference can have a greater probability of being selected than the channel move that results in more interference.

In some embodiments, the temperature $T(t)$ can be gradually decreased during the channel assigning process 300 (i.e., with the increase of t). Thus, the difference between two channel move weights calculated based on a difference in interference values ($\Delta E$) at an early iteration of the channel assigning process 300 (i.e., a larger $T(t)$) is smaller than the difference between two channel move weights calculated based on the same difference in interference values ($\Delta E$) at a later iteration (i.e., a smaller $T(t)$). As a result, the choice between two channel moves that result in different interferences is more random at an early iteration (when $T(t)$ is large) than at a later iteration (when $T(t)$ goes to zero). That is, a channel move that results in more interference is more likely to be selected at an early iteration (based on a relatively larger channel move weight) than at a later iteration (based on a relatively smaller channel move weight) of the channel assigning process 300. Additionally, in some embodiments, the parameter t can be used to control the termination of the channel assigning process 300. In some embodiments, t can be used to represent the number of iterations that can be operated for the channel assigning process 300. In such embodiments, t can be assigned an integer value at the beginning of the process, and decreased by 1 after each iteration. The process can be considered converged when t is decreased to zero.

In some embodiments, after the channel move weights are calculated, the channel move weights can be combined at the radio. In some embodiments, the channel move weights can be combined in any arbitrary means. In some embodiments, the channel move weights associated with all the possible channel moves for the radio can be, for example, summed at the radio. In the example of FIG. 1, the combination of channel move weights for the WAP 110 can be defined as the sum of the channel move weights for each possible move at the WAP 110, which can be calculated to be 4 (channel move weight is 1 for the channel move from channel 1 to channel 3 or channel 4, and 2 for the channel move from channel 1 to channel 2).

At 306, the resulted combination of channel move weights can be sent to the neighbor radios. In some embodiments, the combination of channel move weights can be sent to, for example, the WAP selection modules (e.g., the WAP selection module 230 of the WAP 200 shown and described with respect to FIG. 1) associated with the neighbor radios. Similarly, each of the remaining radio from the set of radios can be configured to send its resulted combination of channel move weights to each other radio from the set of radios. As a result, at 308, combinations of channel move weights of the neighbor radios can be received at the radio from the neighbor radios. In some embodiments, the combinations of channel move weights of the neighbor radios can be received at, for example, the WAP selection module (e.g., the WAP selection module 230 of the WAP 200 shown and described with respect to FIG. 1) associated with the radio. Similarly, each neighbor radio from the set of radios can be configured to receive a combination of channel move weights from each other radio from the set of radios.

In the example of FIG. 1, the WAP 110 can be configured to send its combination of channel move weights to each other WAP 120-180. Similarly, each of the remaining WAPs 120-180 can be configured to send its combination of channel move weights to each other WAP 110-180. As a result, combinations of channel move weights from the WAPs 120-180 can be received at the WAP 110. Similarly, each of the remaining WAPs 120-180 can be configured to receive the combination of channel move weights from each other WAP 110-180.

At 310, the radio can be ranked together with its neighbor radios. In some embodiments, the radio can be ranked at, for example, the WAP selection module associated with the radio, as described with respect to the WAP selection module 230 of the WAP 200 in FIG. 2. In some embodiments, the radio and its neighbor radios can be ranked based on a predetermined order that is determined at or distributed to each radio from the set of radios prior to the ranking operation. As a result, the set of radios can be ranked in the same order at the radio and each of the remaining radios from the set of radios. In some embodiments, the set of radios can be ranked based on, for example, an identifier of each radio from the set of radios. In the example of FIG. 1, the WAPs 110-180 can be ranked in an identical order at each WAP 110-180. In some embodiments, the WAPs 110-180 can be ranked based on, for example, an ascending order of their identifiers. That is, WAP 110, WAP 120, WAP 130, WAP 140, WAP 150, WAP 160, WAP 170, and WAP 180.

At 312, a random number can be received at the radio. As described with respect to the WAP selection module 230 of the WAP 200 in FIG, in some embodiments, the random number can be received at, for example, the WAP selection module associated with the radio. In such embodiments, the random number can be generated at and provided from one of the remaining radios from the set of radios, or an outside source such as, for example, an operator of the wireless network. In some other embodiments, the random number can be generated at the radio and then distributed to each of the remaining radios from the set of radios. In some embodiments, the radio that generates and distributes the random number in an iteration of the channel assigning process 300 can be, for example, the radio selected to implement a channel move in the immediately previous iteration. In some other embodiments, a radio from the set of radios can be specifically-designated to generate and distribute a random number in each iteration of the channel assigning process 300. In the example of FIG. 1, the WAP 110 can be configured to receive a random number from, for example, the WAP 120. Similarly, each other WAP 130-180 can be configured to receive the same random number from the WAP 120.

At 314, a radio to modify can be determined based on the combinations of channel move weights, the random number and the rank of radios. The combinations of channel move weights include the combination of channel move weights calculated at the radio and the combinations of channel move weights received from the neighbor radios. In some embodiments, for example, the combinations of channel move weights can be ranked in the same order as the order used to rank the radios. The random number can then be used to select one combination of channel move weights from the ranked combinations of channel move weights.

In the example of FIG. 1, as described above, the combination of channel move weights for the WAP 110 is calculated to be 4. The combinations of channel move weights for the WAPs 120-180 are calculated to be (in the order of the WAPs 120-180): 3, 3, 5, 5, 6, 6, and 4. Because the WAPs 110-180 are ranked in an ascending order of their identifiers (i.e., WAP 110, WAP 120, WAP 130, WAP 140, WAP 150, WAP 160, WAP 170, WAP 180), the eight combinations of channel move weights for the WAPs 110-180 can be ranked in the same order: 4, 3, 3, 5, 5, 6, 6, and 4. Furthermore, such ranked eight combinations of channel move weights can be mapped to a range (0, 36). Specifically, the WAP 110 is mapped to (0, 4); the WAP 120 is mapped to (4, 7); the WAP 130 is mapped to (7, 10); the WAP 140 is mapped to (10, 15); the WAP 150 is mapped to (15, 20); the WAP 160 is mapped to (20, 26); the WAP 170 is mapped to (26, 32); and the WAP 180 is mapped to (32, 36). The random number can be also mapped into the range of (0, 36) to generate a scaled random number, which then falls into one of the eight blocks corresponding to the WAPs 110-180. If the scaled random number falls onto a boundary between two blocks (e.g., 4), one of the two blocks can be randomly selected. As a result, the WAP that corresponds to the block, into which the scaled random number falls, can be selected as the WAP to implement a channel move. For example, if the scaled random number is 3, the WAP 110 is selected. For another example, if the scaled random number is 17, the WAP 150 is selected.

At 316, it can be determined whether the radio is chosen as the radio to modify. If the radio is not chosen as the radio to modify, the radio can be configured to receive information associated with a hypothetical channel move from a neighbor radio that is chosen as the radio to modify at 318. In some embodiments, the information associated with the hypothetical channel move can be included in, for example, a change indication that is received at the radio from the neighbor radio that is chosen as the radio to modify. In some embodiments, the information associated with the hypothetical move that is to be executed at the selected neighbor radio can include, for example, the current designated channel for the selected neighbor radio, the channel to which the selected neighbor radio is hypothetically changed, and/or so forth. In response to receiving such a change indication from the selected neighbor radio, at 318, the radio can be configured to update the information associated with the selected neighbor radio that is stored within the radio. Specifically, the radio can be configured to update the designated channel for the selected neighbor radio. Similarly, each other radio from the set of radios can be configured to receive a change indication from the selected neighbor radio, and then update information associated with the designated channel for the selected neighbor radio at that radio based on the received change indication.

In the example of FIG. 1, if the WAP 110 is not selected to implement a channel move, the WAP 110 can be configured to receive a change indication from a neighbor WAP 120-180 that is selected to implement a channel move. In response to receiving such a change indication, the WAP 110 can be configured to update information associated with the designated channel for that selected neighbor WAP 120-180. Similarly, each other WAP 120-180 can be configured to receive a change indication from the selected neighbor WAP 120-180, and then update information associated with the selected neighbor WAP 120-180 accordingly.

If the radio is chosen as the radio to modify, potential channels, to which the designated channel for the radio can be changed to, can be ranked at 320. In some embodiments, all the channels from the set of channels except for the current designated channel for the radio can be ranked in an order. In some embodiments, the potential channels can be ranked in any arbitrary order. In some embodiments, the rank of the channels can be different from one iteration to another iteration of the channel assigning process 300. In the example of FIG. 1, if the WAP 110 is selected to implement a channel move, the potential channels for the WAP 110 (i.e., channels 2-4) can be ranked in an arbitrary order. For example, the channels 2-4 can be ranked in an ascending order of the channel identifiers as: channel 2, channel 3, and channel 4.

At 322, a channel can be determined based on channel move weights calculated for the radio at 304, a random number, and the rank of channels. In some embodiments, the random number previously received at 312 and/or used at 314 can be used here again to select a channel. In some other embodiments, a new random number can be generated or received at the radio for selecting a channel. Similar to selecting a radio to modify at 314, the channel move weights associated with channel moves can be ranked in the same order as the order used to rank the channels. The random number can then be used to select one channel move weight from the ranked channel move weights. As a result, the channel move corresponding to the selected channel move weight can be determined.

In the example of FIG. 1, as described above, the channel move weights for moving the designated channel of the WAP 110 from channel 1 to channel 2, channel 3, or channel 4 are calculated to be 2, 1, or 1, respectively. Because the channels 2-4 are ranked in an ascending order of their identifiers (i.e., channel 2, channel 3, channel 4), the three channel move weights can be ranked in the same order: 2, 1, and 1. Furthermore, such ranked channel move weights can be mapped to a range (0, 4), where 4 is obtained by summing all the three channel move weights. Specifically, the channel move associated with moving to channel 2 is mapped to (0, 2); the channel move associated with moving to channel 3 is mapped to (2, 3); and the channel move associated with moving to channel 4 is mapped to (3, 4). Similar to the approach described above with respect to step 314, the random number can be mapped into the range of (0, 4) to generate a scaled random number, which then falls into one of the three blocks corresponding to the three channel moves. If the scaled random number falls onto a boundary between two blocks (e.g., 2), one of the two blocks can be randomly selected. As a result, the channel move that corresponds to the block, into which the scaled random number falls, can be selected as the channel move that is to be hypothetically implemented at the WAP 110. For example, if the scaled random number is 1, the channel move associated with changing the designated channel of the WAP 110 from channel 1 to channel 2 is selected. For another example, if the scaled random number is 3.2, the channel move associated with changing the designated channel of the WAP 110 from channel 1 to channel 4 is selected.

After a channel move is selected at the radio, the move information associated with the selected channel move can be sent from the radio to each of its neighbor radios at 324. In some embodiments, as described above with respect to step 318, the radio can be configured to send a change indication to the neighbor radios. The change indication can include the move information associated with the selected channel move such as, for example, the designated channel for the radio before the channel move, the channel to which the radio is hypothetically changed, and/or so forth. In some embodiments, the change indication can include an identifier of the newly-designated channel for the radio (i.e., the channel to which the designated channel for the radio is changed) and/or an identifier of the previously-designated channel for the radio. Furthermore, in response to receiving such a change indication from the radio, each of the remaining radios from the set of radios can be configured to update the information associated with the designated channel for the radio that is stored at that remaining radio.

In the example of FIG. 1, after a channel move (e.g., moving from channel 1 to channel 2) is selected at the WAP 110, the WAP 110 can be configured to send a change indication to each of the remaining WAPs 120-180. The change indication can include the move information associated with the selected channel move such as, for example, an identifier of the newly-designated channel (e.g., channel 2) for the WAP 110 and/or an identifier of the previously-designated channel (e.g., channel 1) for the WAP 110. In response to receiving the change indication from the WAP 110, each of the remaining WAPs 120-180 can be configured to update information associated with the designated channel for the WAP 110 accordingly (e.g., from channel 1 to channel 2), which is stored within that remaining WAP 120-180.

At 326, it can be determined at the end of the current iteration of the channel assigning process 300 whether the wireless network is converged after the selected channel move is hypothetically implemented at the selected radio within the wireless network. In some embodiments, the wireless network can be determined as converged if a certain number of iterations of the channel assigning process 300 have been completed. In such embodiments, if the simulated annealing function is used to calculate channel move weights, the parameter t in the simulated annealing function described herein can be used to indicate the convergence (or termination) of the channel assigning process 300. For example, t can be assigned an integer value at the beginning of the process, and decreased by 1 after each iteration. The wireless network can be considered as converged (or equivalently, the channel assigning process 300 can be considered as terminated) when t is decreased to zero. In some other embodiments, the wireless network can be determined as converged if the collective performance of the radios in the wireless network reaches a performance threshold. In such embodiments, each radio from the set of radios can be configured to report its performance to a centralized controller (e.g., a radio from the set of radios, a separate controlling device, an operator, etc.), such that the collective performance of the wireless network can be determined at the centralized controller. Furthermore, if the wireless network is determined as converged, the centralized controller can be configured to distribute an indication to each radio from the set of radios such that the radios can terminate the channel assigning process 300. For example, the wireless network can be determined as converged if the sum of the interference values calculated for each radio from the set of radios is lower than a predetermined threshold. In other embodiments, the convergence of the wireless network can be determined based on any other suitable criterion or any combination of multiple suitable criteria.

In the example of FIG. 1, it can be determined whether the wireless network 100 is converged after the selected channel move (e.g., moving from channel 1 to channel 2) is hypothetically implemented at the selected WAP (e.g., the WAP 110). If the sum of the interference values calculated at each WAP 110-180 is lower than a predetermined threshold, the wireless network 100 can be determined as converged. Otherwise, if the set of WAPs 110-180 have completed a certain number of iterations of the channel assigning process, the wireless network 100 can also be determined as converged.

If the wireless network is determined as not yet converged, a new iteration of the channel assigning process 300 can be repeated starting from step 302. Otherwise, if the wireless network is determined as converged, a channel assignment can be implemented at the set of radios at 328. In some embodiments, the channel assignment can be implemented by, for example, the channel implementation module (e.g., the channel implementation module 250 of the WAP 200 shown and described with respect to FIG. 2) associated with the radio. The channel assignment can be the result of all the iterations that have been previously executed during the channel assigning process 300. Thus, the channel assignment can include a finalized designated channel for each radio from the set of radios, which is the result of all the hypothetical channel moves that have been possibly implemented for that radio during the channel assigning process 300. In some embodiments, if an active channel different from the designated channel exists for a radio from the set of radios, the active channel can be replaced by the designated channel from the channel assignment. In such embodiments, a signal can be sent to the radio such that the active channel can be modified to correspond with the designated channel.

In the example of FIG. 1, if the wireless network 100 is determined as converged, a channel assignment can be implemented at the set of WAPs 110-180. Specifically, a designated channel for a WAP from the set of WAPs 110-180 can be implemented at that WAP. If an active channel different from the designated channel exists for a WAP from the set of WAPs 110-180, the active channel can be replaced by the designated channel at that WAP. The active channels for the set of WAPs 110-180 (e.g., the channel assignment shown in FIG. 1) can be replaced by designated channels from the finalized channel assignment (e.g., the operating channel for the WAP 110 is changed from channel 1 to channel 2; the operating channel for the WAP 140 is changed from channel 3 to channel 1; the operating channel for the WAP 150 is changed from channel 3 to channel 1; the operating channel for the WAP 160 is changed from channel 2 to channel 3; the operating channel for the WAP 180 is changed from channel 1 to channel 3).

Figure 4:
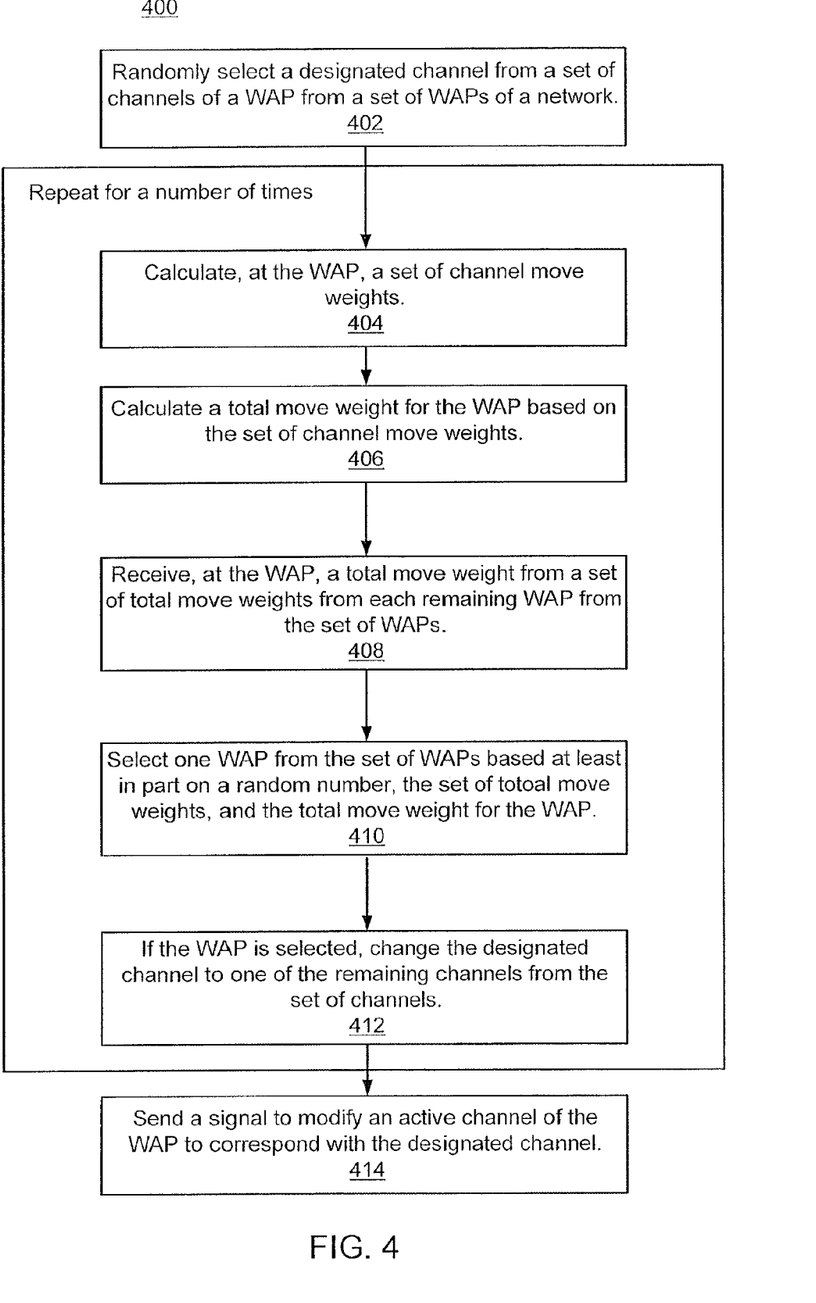
FIG. 4 is a flow chart illustrating a method for assigning channels in a wireless network, according to another embodiment.

FIG. 4 is a flow chart illustrating a method for assigning channels in a wireless network, according to another embodiment. The channel assigning process 400 shown and described with respect to FIG. 4 can be a special case of the scenarios described with respect to FIG. 3. The channel assigning process 400 can be executed at every WAP from a set of WAPs within a wireless network. The WAPs can be structurally and functionally similar to the WAPs 110-180 shown and described with respect to FIG. 1 and the WAP 200 shown and described with respect to FIG. 2. Although the steps 402-414 of the channel assigning process 400 are described from the perspective of one WAP (referred to as "the WAP" herein) from the set of WAPs, the same procedure can be executed at each remaining WAP from the set of WAPs in a similar way.

At 402, a designated channel can be randomly selected from a set of channels of the WAP. The set of channels can be those channels available to the set of WAPs. Similar to the WAP, each of the remaining WAPs from the set of WAPs can be configured to randomly select a designated channel from the set of channels. As a result, each WAP from the set of WAPs can have a designated channel from the set of channels.

At 404, a set of channel move weights can be calculated at the WAP. Each channel move weight from the set of channel move weights can be associated with a possible channel change at the WAP from the designated channel to one of the remaining channels from the set of channels. In some embodiments, the channel move weight associated with a possible channel move can be calculated based on one or more interference values associated with the channel move and the WAP. In such embodiments, the WAP can be configured to calculate the interference values prior to calculating the channel move weight. In some embodiments, the channel move weights can be calculated using a stochastic optimization algorithm such as, for example, a simulated annealing function (as described with respect to FIG. 3), a stochastic hill climbing algorithm, or the like.

At 406, a total move weight can be calculated for the WAP based on the set of channel move weights. The total move weight can be, for example, a combination of the set of channel move weights calculated for the WAP. In some embodiments, the total move weight can be a sum of all the channel move weights from the set of channel move weights. Furthermore, in some embodiments, the WAP can be configured to send the total move weight to each of the remaining WAPs from the set of WAPs.

At 408, a total move weight from a set of total move weights can be received at the WAP from each remaining WAP from the set of WAPs. Similar to the WAP, each remaining WAP from the set of WAPs can be configured to calculate a total move weight for that remaining WAP, and then send the calculated total move weight to each other WAP from the set of WAPs including the WAP. As a result, each WAP from the set of WAPs can have the total move weight from each other WAP from the set of WAPs.

At 410, one WAP can be selected from the set of WAPs based at least in part on a random number, the set of total move weights, and the total move weight for the WAP. In some embodiments, the set of WAPs can be ranked in the same order at each WAP from the set of WAPs. The set of total move weights, each of which corresponds to a WAP from the set of WAPs, can then be ranked in the same order as the corresponding WAPs. One total move weight can then be selected from the set of total move weights based on the random number and the ranked total move weights. As a result, the WAP corresponding to the selected total move weight can be selected from the set of WAPs.

At 412, if the WAP is selected, the designated channel for the WAP can be hypothetically changed to one of the remaining channels from the set of channels. In some embodiments, a channel can be selected from the remaining channels based on, for example, the channel move weights associated with the remaining channels, a random number, and/or other parameters, as described with respect to FIG. 3. Additionally, the random number used to select a channel from the remaining channels can be equal to or different from the random number used to select the WAP from the set of WAPs.

The steps 404-412 can be repeated for a number of times. In some embodiments, the number of times for repetition can be based on a simulated annealing temperature (e.g., T(t) in the simulated annealing function described with respect to FIG. 3). For example, the repeated execution of the steps 404-412 can be terminated if the simulated annealing temperature is decreased to a non-positive value. In such embodiments, the set of channel move weights can be calculated using, for example, a simulated annealing function, and the calculation can be based at least in part on the simulated annealing temperature. In some other embodiments, the number of times for repetition can be based on a total interference level of the wireless network. In such embodiments, the total interference level of the wireless network can be calculated and compared against, for example, a predetermined threshold after each iteration of the steps 404-412. The repeated execution of the steps 404-412 can be terminated if the total interference level of the wireless network drops below the predetermined threshold.

At 414, a signal can be sent to modify an active channel of the WAP to correspond with the designated channel. At the end of the channel assigning process 400, a finalized channel assignment can be determined for the set of WAPs. The finalized channel assignment can include a designated channel for each WAP from the set of WAPs. The signal associated with the designated channel for the WAP can be sent such that the WAP can be configured to change its active channel to its designated channel from the finalized channel assignment. Similar to the WAP, each remaining WAP from the set of WAPs can be configured to change its active channel to its designated channel from the finalized channel assignment.

While shown and described above with respect to FIGS. 1 and 3 as a WAP having a radio operating at one channel, in other embodiments, a WAP can have multiple radios operating at multiple channels. In such embodiments, each radio from the set of radios included in the WAP can be assigned with a channel from a set of channels in a similar way as described herein. Specifically, a radio included in a WAP can be selected from the set of radios associated with the set of WAPs, and then a possible channel move can be selected from a set of possible channel moves associated with the selected radio.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD- ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method, comprising:
calculating, at a wireless access point (WAP) from a plurality of WAPs within a network,
a hypothetical interference value for each channel from a plurality of channels of the WAP;
calculating, based on the hypothetical interference value for each channel from the plurality of channels and base on a designated channel of the WAP, a total hypothetical move weight of WAP;
sending the total hypothetical move weight to each remaining WAP from the plurality of WAPs;
receiving, at the WAP, a total hypothetical move weight from each remaining WAP from the plurality of WAPs;
selecting one WAP from the plurality of WAP based on (1) a random number, (2) the total hypothetical move weight of the WAP, (3) the plurality of total hypothetical move weights from the remaining WAPs from the plurality of WAPs, and (4) a rank of the plurality of WAPs;
changing, if the WAP is selected, the designated channel of the WAP to a hypothetical designated channel; and
repeating the calculating ,the sending, the receive, the selecting, and the changing, until the total hypothetical move weights from each WAP from the plurality of WAPs collectively satisfy pre-determined interference convergence criteria.

2. The method of claim 1, wherein the calculating the total hypothetical move weight of the WAP is based on calculating the hypothetical interference value for each channel from a plurality of channels of the WAP using a stochastic optimization algorithm, each hypothetical interference value for each channel from a plurality of channels of the WAP being associated with a channel change from the designated channel from the plurality of channels to one of the remaining channels from the plurality of channels.

3. The method of claim 1, further comprising:
sending the total hypothetical move weight for the WAP to the remaining WAPs from the plurality of WAPs such that each remaining WAP from the plurality of WAPs selects the one WAP from the plurality of WAPs based at least in part on (1) the random number, (2) the total hypothetical move weight for the WAP, (3) the plurality of total hypothetical move weights from the remaining WAPs, and (4) the rank of the plurality of WAPs.

4. The method of claim 1, further comprising:
sending a signal to modify an active channel of a radio of the WAP to correspond with the designated channel after the designated channel has been changed to the hypothetical designated channel.

5. The method of claim 1, further comprising:
defining, at the WAP, the random number; and
sending the random number to the remaining WAPs from the plurality of WAPs such that each WAP from the remaining WAPs selects the one WAP from the plurality of WAPs based at least in part on the random number.

6. The method of claim 1, further comprising:
receiving, if the WAP is not selected, a change indication associated with a channel change at a selected WAP from the plurality of WAPs.

7. The method of claim 1, further comprising:
randomly selecting the hypothetical designated channel from the plurality of channels prior to calculating the hypothetical interference value for each channel from the plurality of channels.

8. The method of claim 1, wherein the random number is a first random number, the method further comprising:
selecting, if the WAP is selected, a channel from the plurality of channels not currently the designated channel based on (1) a plurality of hypothetical move weights, (2) a second random number, and (3) a rank of the plurality of channels not currently the designated channel,
each hypothetical move weight for each channel from the plurality of channels being associated with a possible channel change from the designated channel from the plurality of channels to one of the remaining channels from the plurality of channels.

9. An apparatus, comprising:
a channel weight module of a wireless access point (WAP) configured to calculate a plurality of hypothetical channel move weights, each hypothetical channel move weight from the plurality of hypothetical channel move weights being associated with a possible channel change from a designated channel from a plurality of channels of the WAP to one of the remaining channels from the plurality of channels, the channel weight module configured to calculate a total hypothetical move weight for the WAP based on the plurality of hypothetical channel move weights, the WAP being from a plurality of WAPs within a network;
a WAP selection module operatively coupled to the channel weight module, the WAP selection module configured to receive, from each remaining WAP from the plurality of WAPs, a total hypothetical move weight, the WAP selection module configured to select one WAP from the plurality of WAPs based on (1) a first random number, (2) the total hypothetical move weight of each WAP from the plurality of WAPs, and (3) a rank of the plurality of WAPs;
a channel selection module operatively coupled to the WAP selection module, the channel selection module configured to select, if the WAP is selected by the WAP selection module, a hypothetical designated channel from the plurality of channels based on (1) a second random number, (2) the plurality of hypothetical channel move weights, and (3) a rank of the remaining channels from the plurality of channels, the channel selection module configured to change the designated channel to the hypothetical designated channel; and a channel implementation module operatively coupled to the channel selection module, the channel implementation module configured to instruct:

the channel weight module to repeat the calculating the plurality of hypothetical channel move weights and the calculating the total hypothetical move weight for the WAP, the WAP selection module to repeat the receiving, from each remaining WAP from the plurality of WAPs, a total hypothetical move weight and the selecting one WAP from the plurality of WAPs, and the channel selection to repeat the selecting the hypothetical designated channel and the changing of the designated channel, until the total hypothetical move weights from each WAP from the plurality of WAPs collectively satisfy pre-determined interference convergence criteria, the channel implementation module configured to send a signal to implement the designated channel as an active channel of a radio of the WAP when the pre-determined interference convergence criteria are satisfied.

10. The apparatus of claim 9, wherein the channel weight module is configured to calculate the plurality of hypothetical channel move weights using a stochastic optimization algorithm.

11. The apparatus of claim 9, wherein the channel weight module is configured to send the total hypothetical move weight for the WAP to the remaining WAPs from the plurality of WAPs such that each remaining WAP from the plurality of WAPs selects the one WAP from the plurality of WAPs.

12. The apparatus of claim 9, wherein the first random number is equal to the second random number.

13. The apparatus of claim 9, further comprising:
an interference module operatively coupled to the channel weight module, the interference module configured to calculate, at the WAP, an interference value for each channel from the plurality of channels, the channel weight module configured to calculate the plurality of hypothetical channel move weights based on the interference value for each channel from the plurality of channels.

14. A non-transitory processor-readable medium storing code representing instructions to be executed by a processor, the code comprising code to cause the processor to:

randomly select a designated channel from a plurality of channels of a wireless access point (WAP) from a plurality of WAPs of a network;

repeat the following for a number of times, number of times being determined by whether a plurality of total hypothetical move weights from the plurality of WAPs collectively satisfy pre-determined interference convergence criteria:

calculate, at the WAP, a plurality of hypothetical channel move weights, each hypothetical channel move weight from the plurality of hypothetical channel move weights being associated with a possible channel change from the designated channel to one of he remaining channels from the plurality of channels;

calculate a total hypothetical move weight for the WAP based on the plurality of hypothetical channel move weights;

receive, at the WAP and from each remaining WAP from the plurality of WAPs, a total hypothetical move weight from the plurality of total hypothetical move weights;

select one WAP from the plurality of WAPs based at least in part on (1) a random number, (2) the plurality of total hypothetical move weights, and (3) the total hypothetical move weight for the WAP; and change the designated channel to a hypothetical designated channel from the plurality of channels if the WAP is selected; and send, after the number of times, a signal to modify an active channel of the WAP to correspond with the designated channel.

15. The non-transitory processor-readable medium of claim 14, wherein the number of times is base on a simulated annealing temperature, the plurality of hypothetical channel move weights is calculated based part on the simulated annealing temperature.

16. The non-transitory processor-readable medium of claim 14, wherein the number of times is based on a total interference level of the network.

17. The non-transitory processor-readable mediums of claim 14, further comprising code to cause the processor to:
send an identifier of the designated channel to the remaining WAPs from the pluraliy of WAPs in response to the code to cause the processor to change.

18. The non-transitory processor-readable medium of claim 14, further comprising code to cause the processor to:
send the total hypothetical move weight for the WAP to the remaining WAPs from the plurality of WAPs such that each remaining WAP from the plurality of WAPs selects the one WAP from the plurality of WAPs based at least in part on (1) the random number, (2) the plurality of total hypothetical move weights, and (3) the total hypothetical move weight for the WAP.

19. The method of claim 1, wherein the rank is based on a predetermined order provided to each WAP from the plurality of WAPs.

20. The method of claim 1, wherein:
the WAP from the plurality of WAPs is a first WAP; and
the random number is generated based on one of:
selecting a second WAP at a particular position in the rank of the plurality of WAPs to generate the random number for each WAP from the plurality of WAPs;
generating the random number at the first WAP from the plurality of WAPs and sending the random number to each WAP from the plurality of WAPs; or
receiving the random number from an external source.

* * * * *